United States Patent [19]
DeWitt

[11] 3,979,094
[45] Sept. 7, 1976

[54] ADJUSTABLE HANGER STRAP

[76] Inventor: Stuart DeWitt, 799 Wendover Blvd., Muskegon, Mich. 49441

[22] Filed: Feb. 19, 1975

[21] Appl. No.: 550,982

[52] U.S. Cl. ............................... 248/60; 24/16 PB; 24/73 PB; 248/74 PB
[51] Int. Cl.² ......................................... F16L 3/14
[58] Field of Search ............. 248/59, 60, 61, 74 PB, 248/327; 24/73 PB, 16 PB, 30.5 P, 265 R, 206 R, 17 R, 17 AP, 271, 32, 30.5 S, 36, 19, 68 R, 68 F, 270, 271, 16 R, 200, 201 BS, 230.5 CS; D2/311; 2/311

[56] References Cited
UNITED STATES PATENTS

| 904,184 | 11/1908 | Dreese | 24/17 A X |
|---|---|---|---|
| 1,086,442 | 2/1914 | Cornelius | 248/59 |
| 1,669,446 | 5/1928 | Bowers | 248/59 |
| 1,756,038 | 4/1930 | Shwayder | 24/17 AP |
| 2,759,390 | 8/1956 | Edwards | 24/16 PB |
| 2,936,980 | 5/1960 | Rapata | 248/74 PB |
| 3,049,326 | 8/1962 | Otterson | 248/59 |
| 3,224,054 | 12/1965 | Lige | 248/74 PB X |
| 3,365,753 | 1/1968 | Prenner et al. | 24/206 A X |
| 3,438,095 | 4/1969 | Evans | 24/16 PB |

FOREIGN PATENTS OR APPLICATIONS

| 1,471,561 | 1/1967 | France | 24/30.5 P |
|---|---|---|---|
| 796,222 | 4/1936 | France | 24/17 AP |
| 873,304 | 7/1961 | United Kingdom | 248/74 PB |

*Primary Examiner*—Roy D. Frazier
*Assistant Examiner*—Rodney H. Bonck
*Attorney, Agent, or Firm*—McGarry & Waters

[57] ABSTRACT

Adjustable hanger strap for hanging pipe or pipelike structure or wire bundles or cables from the underside of rafters or ceilings or other convenient locations. The adjustable hanger strap comprises a flat elongated strip of a flexible material such as a plastic material and has a retainer with a slotted aperture at one end thereof through which the other end of the strip may be passed to form a loop. The strip is provided along the length thereof with a series of holes surrounded by protuberances which strengthen the holes and in addition releasably retain the passage of the strip through the aperture so that the strip is retained in a loop form in a position around the pipe or wire bundles. Nails may be driven through the holes in the free end portion of the strip for securing the structure to rafters or other such support.

5 Claims, 3 Drawing Figures

U.S. Patent  Sept. 7, 1976  3,979,094
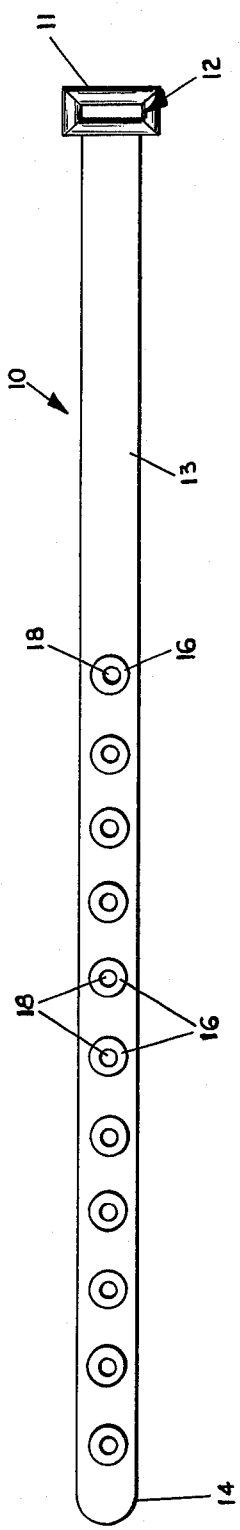
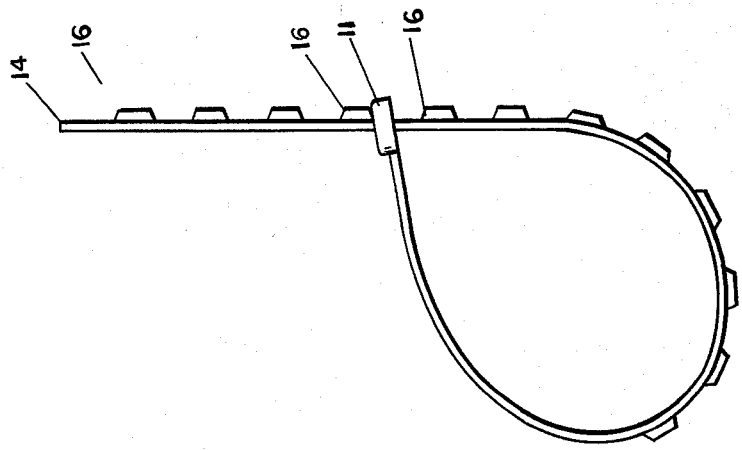
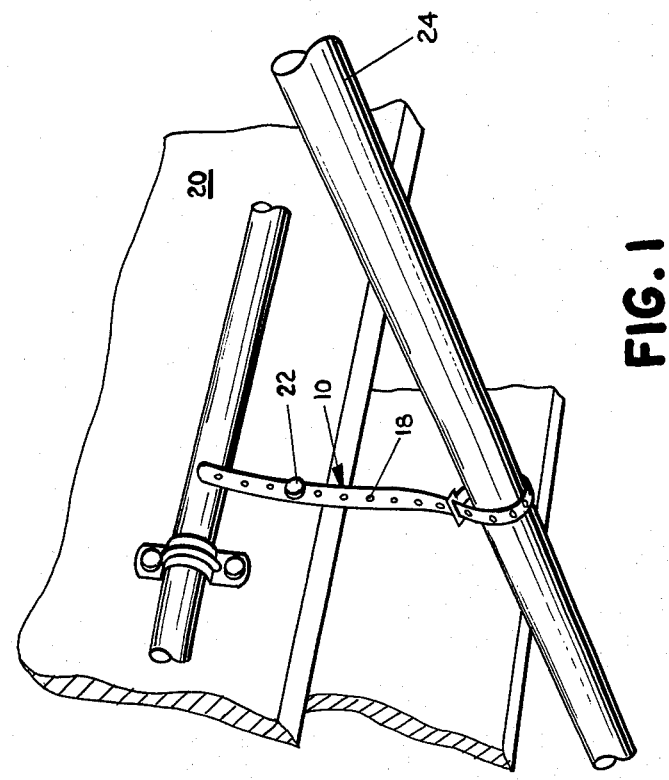

ADJUSTABLE HANGER STRAP

BACKGROUND OF THE INVENTION

1. Field of the Invention

This invention relates to a strap for hanging pipe-like structures or wire or wire bundles to a wall or overhead structure.

2. State of the Prior Art

Various devices have heretofore been used for securing pipes, cables, wires and like articles to walls and underside of rafters. One such securing device is disclosed in U.S. Pat. No. 2,936,980, issued May 17, 1960, and includes a one-piece elongated member made of a flexible material. A relatively thin narrow strip has an enlarged end or head substantially thicker than the strap provided with a slot through which the thin narrow strap may pass. The relatively thin narrow strap portion contains a plurlity of integral interlocking means defined by inclined cam surfaces facing toward the free end of the strap portion and terminating in a shoulder surface extending perpendicularly from the strap portion. The free end of the strap is wrapped around the cable and inserted through the slot, causing the cam surface to compress as it passes through the slot. The locking means prevent the strap from being withdrawn by the interengagement of the shoulder surface.

Another pipe hanging device includes an elongated metal strip containing a plurality of holes therethrough randomly spaced along the entire length of the strip. Selected lengths of the flat metal strip are positioned around the pipe with one end of the strip secured to an intermediate portion of the strip by a bolt which extends through an intermediate hole in the strip thereby forming a loop. The unsecured end of the strip is attached to a wall or rafter by driving a nail through one of the holes.

SUMMARY OF THE INVENTION

In accordance with the invention, an adjustable hanger strap for hanging pipe or pipe-like structures comprises a flat elongated and flexible strip of rectangular cross-section containing a plurality of protuberances of solid material projecting outwardly from one facial surface of the flat strip and spaced therealong, at least some of the protuberances having holes therethrough. An enlarged portion formed on an end of the flat strip of greater width than the flat strip incorporates an aperture with a length at least as long as the width of the flexible strip and a width less than the sum of the thickness of the flat strip and the height of the protuberances. The protuberances are of conical or spherical shape to facilitate passage and release of the flat strip and protuberances through the aperture. The free extremity of the flat strip can be attached to a wall or rafter by nail or screw through one or more of the holes.

An important feature of the invention is the strengthening of the fastening holes by the protuberances which also releasably restrain the strap in a looped position after insertion into the aperture. Another important feature of the invention is the flexibility of the flat strip which allows it to be axially twisted so as to conveniently support a pipe or wires in a relative position parallel or perpendicular to the support. Still another important feature of the invention is that the strap is flexible and is positioned around the extremity of the pipe or pipe-like structure by inserting the end of the strip through the aperture thereby forming a closed loop which is releasably fixed in a given position.

BRIEF DESCRIPTION OF THE DRAWINGS

The invention will now be described with reference to the accompanying drawings in which:

FIG. 1 is a perspective view of the adjustable hanger strap positioned around the pipe and nailed to a rafter;

FIG. 2 is a plan view of the adjustable hanger strap shown in FIG. 1:

FIG. 3 is a side view of the strap shown in FIG. 2 with the strap forming a loop.

DESCRIPTION OF THE PREFERRED EMBODIMENT

Referring now to the drawings, an adjustable hanger strap 10 is formed in one piece of a flexible material such as polyethylene or nylon. The strap 10 has a flat elongated strip 13 of rectangular cross-section such that the opposing facial surfaces are substantially wider than the joining edge surfaces and at one end thereof forms an enlarged retainer portion 11 containing a rectangular aperture 12 which is sized to receive the strip 13. The aperture 12 is thus perpendicular with respect to the strip's longer axis. Along the length of the elongated strip 13 are protuberances 16 made of solid material which extend from one side of the strip and which have holes 18 therethrough. The size of the aperture 12 is long enough to accommodate the width of the strip 13 and wide enough to accommodate the total height of the protuberances 16 and the strip 13. However, the thickness of a protuberance and the strip is desirably slightly greater than the slot width. The protuberances 16 strengthen the holes 18 and in addition releasably retain the strip in the aperture 12. This restraint holds the strap in a given size loop when the strip 13 is forcibly pulled through the aperture 12 as shown in FIG. 3. The loop as formed in FIG. 3 is held in position by interference of the protuberances 16 with the enlarged portion 11 and may be adjusted to any desired position along the elongated member.

In practice, the strap is looped about the pipe as shown in FIG. 1 by passing the strip 13 through the aperture 12 and adjusting the loop to snugly fit around the pipe. The insertion of the strip 13 into the aperture 12 is aided by the rounded end 14 of the strip 13. The interference of the protuberances 16 with the enlarged portion 11 retains the strap in its looped position. After properly positioning the pipe beneath the rafter 20 a nail or a screw 22 is positioned in the most convenient hole 18 and driven into the rafter. As also seen in FIG. 1, the flexible nature of the strap allows it to be axially twisted so as to conveniently support a pipe or wires in a relative position parallel or perpendicular to the length of the rafter.

The strap is integrally formed in one piece of a plastic material such as polyethylene, polyvinyl chloride, nylon or other similar moldable plastic. The material must be flexible enough to be looped or twisted as shown in FIG. 1, yet durable enough to provide lasting support for the pipe.

The protuberances 16 may be frusto-conical or spherical in shape.

From the above description it will be appreciated that the present invention has provided an extremely simple, economical hanging device which is able to be quickly wrapped around a pipe, held securely in its looped condition and quickly nailed to a rafter. Cutting and other cumbersome procedures are avoided.

Whereas the invention has been described with respect to protuberances 16 all having holes therethrough, it is within the scope of the invention to provide some protuberances without holes therethrough. For example, the protuberances nearer to the retainer portion can be without holes if desirable.

Reasonable variations and modifications are possible within the scope of the foregoing disclosure without departing from the spirit of the invention which is defined in the appended claims.

The embodiments of the invention in which an exclusive property or privelege is claimed are defined as follows:

1. An adjustable hanger strap for securely suspending pipes, cables and the like from a support, the strap comprising:
   an elongated and flexible strip having a relatively thin cross-sectional thickness such that opposing facial surfaces are substantially wider than adjoining edge surfaces;
   a plurality of spaced protuberances of solid material projecting outwardly from the plane of one of said facial surfaces of said strip, the protuberances having holes therethrough for positioning fasteners therethrough for securing the strap to supports; and
   an aperture formed at one end of said flat strip, said aperture having a length at least as large as the width of said strip and a width less than the sum of the thickness of said strip and said protuberances, said aperture receiving the free end extremity of said flat strip to form and to releasably retain said flat strip in a looped position by virtue of a releasable retention of said protuberances within said aperture.

2. An adjustable hanger strap as claimed in claim 1 wherein the protuberances projecting outwardly from one surface are of a frusto-conical shape to facilitate passage and release of the said flat strip and protuberances through the aperture.

3. An adjustable hanger strap as claimed in claim 1 wherein the aperture is transverse to the flat strip and rectangular in shape.

4. An adjustable hanger strap as claimed in claim 1 wherein the strap is integrally molded in one piece of a flexible and moldable plastic.

5. An adjustable hanger strap according to claim 1 wherein the end of said strap having the aperture is enlarged in width such that the aperture has its longer axis perpendicular with the longer axis of said flat strip.

* * * * *